US009106598B2

(12) United States Patent
Wall

(10) Patent No.: US 9,106,598 B2
(45) Date of Patent: *Aug. 11, 2015

(54) ENHANCED PRIVACY AND CONTROL FEATURES FOR AN ELECTRONIC MESSAGE

(71) Applicant: International Business Machines Corporation, Armonk, NY (US)

(72) Inventor: Stephen Wall, Jersey City, NJ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/454,878

(22) Filed: Aug. 8, 2014

(65) Prior Publication Data

US 2014/0351356 A1    Nov. 27, 2014

Related U.S. Application Data

(63) Continuation of application No. 12/193,634, filed on Aug. 18, 2008, now Pat. No. 8,832,201.

(51) Int. Cl.
*G06F 15/16* (2006.01)
*H04L 12/58* (2006.01)
*G06Q 10/10* (2012.01)

(52) U.S. Cl.
CPC ........... *H04L 51/046* (2013.01); *G06Q 10/107* (2013.01)

(58) Field of Classification Search
CPC .................. H04L 51/046; G06Q 10/107
USPC ................................. 709/200, 206
See application file for complete search history.

(56) References Cited

U.S. PATENT DOCUMENTS 5,958,005 A * 9/1999 Thorne et al. ................. 709/202
6,072,944 A * 6/2000 Robinson ..................... 716/117
6,112,983 A * 9/2000 D'Anniballe et al. ........ 235/379
(Continued)

FOREIGN PATENT DOCUMENTS

EP        1077421 A2     2/2001
WO   WO2006034942 A1    4/2006

OTHER PUBLICATIONS

Notice of Allowance (mail date May 6, 2014) for U.S. Appl. No. 12/193,634, filed Aug. 18, 2008.
(Continued)

*Primary Examiner* — Anthony Mejia
(74) *Attorney, Agent, or Firm* — Schmeiser, Olsen & Watts, LLP; Matthew Chung

(57) ABSTRACT

A method and system for sending electronic messages. A command syntax is embedded in an electronic message on a sender device. The electronic message is to be sent by a sender from the sender device to a user at a recipient device. The electronic message includes a data structure to which the command syntax is coupled. The command syntax comprises a text string coded to only describe and trigger one or more pre-defined selective enhanced privacy and control features for one or more portions of the data. The command syntax includes one or more commands which upon being executed at the recipient device prevent the user at the recipient device who receives the electronic message from printing the received electronic message, storing the received electronic message, copying the received electronic message, forwarding the received electronic message, and blind carbon copying the received electronic message.

20 Claims, 8 Drawing Sheets

(56) References Cited

U.S. PATENT DOCUMENTS

| | | | |
|---|---|---|---|
| 6,510,381 B2* | 1/2003 | Grounds et al. | 701/517 |
| 6,529,942 B1* | 3/2003 | Gilbert | 709/206 |
| 6,701,347 B1* | 3/2004 | Ogilvie | 709/206 |
| 6,920,564 B2 | 7/2005 | Decuir | |
| 7,149,893 B1* | 12/2006 | Leonard et al. | 713/154 |
| 7,336,943 B2* | 2/2008 | Crocker et al. | 455/414.1 |
| 7,493,269 B2* | 2/2009 | Fostick et al. | 705/14.26 |
| 7,493,365 B2* | 2/2009 | Wies et al. | 709/204 |
| 7,526,477 B1* | 4/2009 | Krause | 1/1 |
| 7,703,140 B2* | 4/2010 | Nath et al. | 726/26 |
| 7,783,715 B2* | 8/2010 | Muller | 709/206 |
| 7,912,908 B2* | 3/2011 | Cai et al. | 709/206 |
| 7,917,285 B2* | 3/2011 | Rothschild | 701/420 |
| 7,978,353 B2* | 7/2011 | Kasatani | 358/1.14 |
| 8,069,209 B1* | 11/2011 | Levesque et al. | 709/206 |
| 8,073,122 B2* | 12/2011 | Kay et al. | 379/201.01 |
| 8,103,724 B2* | 1/2012 | Dawson et al. | 709/206 |
| 8,141,131 B2* | 3/2012 | Nakamura et al. | 726/1 |
| 8,171,523 B2* | 5/2012 | Weksler et al. | 726/2 |
| 8,423,618 B1* | 4/2013 | Spivack et al. | 709/206 |
| 8,832,201 B2 | 9/2014 | Wall | |
| 2003/0126215 A1 | 7/2003 | Udell et al. | |
| 2003/0131057 A1* | 7/2003 | Basson et al. | 709/206 |
| 2005/0091499 A1* | 4/2005 | Forlenza et al. | 713/176 |
| 2005/0204008 A1* | 9/2005 | Shinbrood | 709/206 |
| 2005/0235163 A1* | 10/2005 | Forlenza et al. | 713/193 |
| 2005/0267937 A1* | 12/2005 | Daniels et al. | 709/206 |
| 2006/0184628 A1* | 8/2006 | Coley et al. | 709/206 |
| 2007/0005713 A1* | 1/2007 | LeVasseur et al. | 709/206 |
| 2007/0073816 A1* | 3/2007 | Kumar et al. | 709/206 |
| 2007/0143423 A1 | 6/2007 | Kieselbach et al. | |
| 2008/0133673 A1* | 6/2008 | Abdelhadi et al. | 709/206 |
| 2008/0239406 A1* | 10/2008 | Nakano | 358/401 |
| 2008/0281930 A1* | 11/2008 | Hartselle et al. | 709/206 |
| 2009/0214034 A1* | 8/2009 | Mehrotra et al. | 380/255 |
| 2009/0319623 A1* | 12/2009 | Srinivasan et al. | 709/206 |
| 2010/0146580 A1* | 6/2010 | Chen et al. | 725/148 |
| 2010/0157061 A1* | 6/2010 | Katsman et al. | 348/149 |
| 2011/0106894 A1* | 5/2011 | Hodge et al. | 709/206 |
| 2011/0113109 A1* | 5/2011 | LeVasseur et al. | 709/206 |
| 2011/0191487 A1* | 8/2011 | Ziems | 709/231 |

OTHER PUBLICATIONS

Amendment (filed Jan. 7, 2014) for U.S. Appl. No. 12/193,634, filed Aug. 18, 2008.

Office Action (mail date Oct. 8, 2013) for U.S. Appl. No. 12/193,634, filed Aug. 18, 2008.

Amendment (filed Mar. 28, 2013) for U.S. Appl. No. 12/193,634, filed Aug. 18, 2008.

Office Action (mail date Nov. 29, 2012) for U.S. Appl. No. 12/193,634, filed Aug. 18, 2008.

RCE (filed Jun. 6, 2012) for U.S. Appl. No. 12/193,634, filed Aug. 18, 2008.

Final Office Action (mail date Mar. 27, 2012) for U.S. Appl. No. 12/193,634, filed Aug. 18, 2008.

Amendment (filed Dec. 12, 2011) for U.S. Appl. No. 12/193,634, filed Aug. 18, 2008.

Office Action (mail date Sep. 13, 2011) for U.S. Appl. No. 12/193,634, filed Aug. 18, 2008.

Amendment (filed Mar. 17, 2011) U.S. Appl. No. 12/193,634, filed Aug. 18, 2008.

Office Action (mail date Dec. 17, 2010) for U.S. Appl. No. 12/193,634, filed Aug. 18, 2008.

Preliminary amendment (filed Sep. 13, 2010) for U.S. Appl. No. 12/193,634, filed Aug. 18, 2008.

* cited by examiner

ENHANCED PRIVACY AND CONTROL FEATURES FOR AN ELECTRONIC MESSAGE

This application is a continuation application claiming priority to Ser. No. 12/193,634, filed Aug. 18, 2008.

FIELD OF THE INVENTION

The present invention relates to computer systems and software, and more specifically to an automated technique for providing selective or customizable enhanced privacy and control features to one or more portions of an electronic message distributed by a sender or user.

BACKGROUND OF THE INVENTION

In today's environment, individuals utilize electronic mail (e-mail) to communicate with one another. Often, e-mail messages addressed to a recipient contain files that may be forwarded to other recipients without the sender having any control over the e-mail message that is sent, especially, any attachments within the e-mail message. As such, there is a need for an innovative communication system, where communications can be personalized and secured in a cost effective manner.

SUMMARY OF THE INVENTION

The present invention resides in a method, system and program product for providing selective enhanced privacy and control features to one or more portions of an electronic message. The method includes providing an enhanced data messaging tool, creating an electronic message on a device for distribution of data to one or more intended recipients, selecting, using the enhanced data messaging tool, one or more pre-defined selective enhanced privacy and control features for one or more portions of data contained in the electronic message created by a sender, wherein a respective one or more pre-defined selective enhanced privacy and control features selected for one portion differs from another respective one or more predefined selective enhanced privacy and control features selected for another portion of the one or more portions of data contained in the electronic message, and transmitting, using a transmission medium, the electronic message created containing the one or more portions of data for distribution to respective devices of the one or more intended recipients, wherein the one or more portions of data in the electronic message received on the respective recipient device notifies a respective recipient regarding the one or more pre-defined selective enhanced privacy and control features selected by the sender of the electronic message.

In an embodiment, the one or more portions of data includes at least one of: a text message, an e-mail message, an instant message, an application file, a video file, a picture file, a image file, a sound file, an audio file, a compressed file, an uncompressed file, a voicemail application, an electronic page, an Internet frame, a web page, an avatar, a folder, a container, an icon, an emoticon, a link, a software component, a programming component and a flash file. In an embodiment, the one or more pre-defined selective enhanced privacy and control features includes one or more of: one or more pre-defined passwords, a pre-defined time frame for the one or more portions of the electronic message to auto delete on a recipient device, wherein the pre-defined time frame includes at least one of: number of seconds, number of days, number of weeks, number of months, number of years, a specific date and time, a unique event, a recurring event and an arbitrary time frame pre-defined by the sender, one or more local time zones, one or more international time zones, control features applicable to sender only, control features applicable to recipient only, control features applicable to both recipient and sender, unsend feature, redirect feature, copying control features, forwarding control features, blind carbon copy control features, storing control features, printing control features, language type control features, voice control features, auto-recovery rights for the electronic message, sender's rights to make changes to the electronic message, recipient's rights to make changes to electronic message, repetition features for the electronic message, one or more attributes in the electronic message, in-network rights of sender, in-network rights of recipient, out-of-network rights of sender, out-of-network rights of recipient, track status of the one or more portions of data within electronic message, track status of electronic message, data count features, billing features, advertising features, features for turning on the enhanced data messaging tool, features for turning off the enhanced data messaging tool, auto-recovery rights for data in the electronic message, auto-recovery rights for the electronic message, recipient selection for the electronic message, animation features for the electronic message, syntax commands for initiating enhanced privacy and control features and security features for the electronic message includes at least one of: Morse code, encryption-decryption keys, fingerprinting, retinal scanning, temperature-based security feature, frequency-based security feature and a customized code for the electronic message. In an embodiment, the device includes at least one of: a wired device, a wireless device, a personal computer, a server, a blade, a storage device, a pager, a PDA (Personal Digital Assistant), a touchscreen, a keyboard, a handheld device, a cell phone, a router, a GPS (Global Positioning System) receiver, a RFID (Radio Frequency Identification) device, and wherein the enhanced data messaging tool is installed as at least one of: an operating system, an operating system enhancement, firmware, an applet, a plug-in, a protocol, an application, a file and a folder.

In an embodiment, the transmission medium includes at least one of: a phone line, a cable, the Internet, a wire line, a wireless line, a wired device, a wireless device, a satellite, a sound medium, a fiber optic cable, a light medium, a cell tower, a vibration medium, a frequency medium, a wavelength medium, a temperature medium, a Bluetooth medium, an infrared medium, a radio tower, an electrical line, a local area network (LAN), a wide area network (WAN), a metropolitan area network (MAN), a wireless mesh network (WMN), a global network, a temperature medium, a frequency medium, a language medium, a Braille code medium, a selective code medium, a broadcast medium, a unicast medium, a multicast medium, a point-to-point broadcast, a point-to-multipoint broadcast, a multiplexed broadcast, a time-division multiplexed medium, a frequency-division multiplexed medium. In an embodiment, if the one or more pre-defined selective enhanced privacy and control features selected include a respective pre-defined time frame for the one or more portions of data in the electronic message to auto delete on a recipient device, the one or more portions of data in the electronic message are automatically deleted on the respective recipient device upon expiration of the respective pre-defined time frame. In an embodiment, if the one or more pre-defined selective enhanced privacy and control features does not include a respective pre-defined time frame for the one or more portions of data in the electronic message to auto delete on a respective recipient device, the one or more portions of data in the electronic message will not be automatically deleted on the respective recipient device upon expiration of the respective pre-defined time frame.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
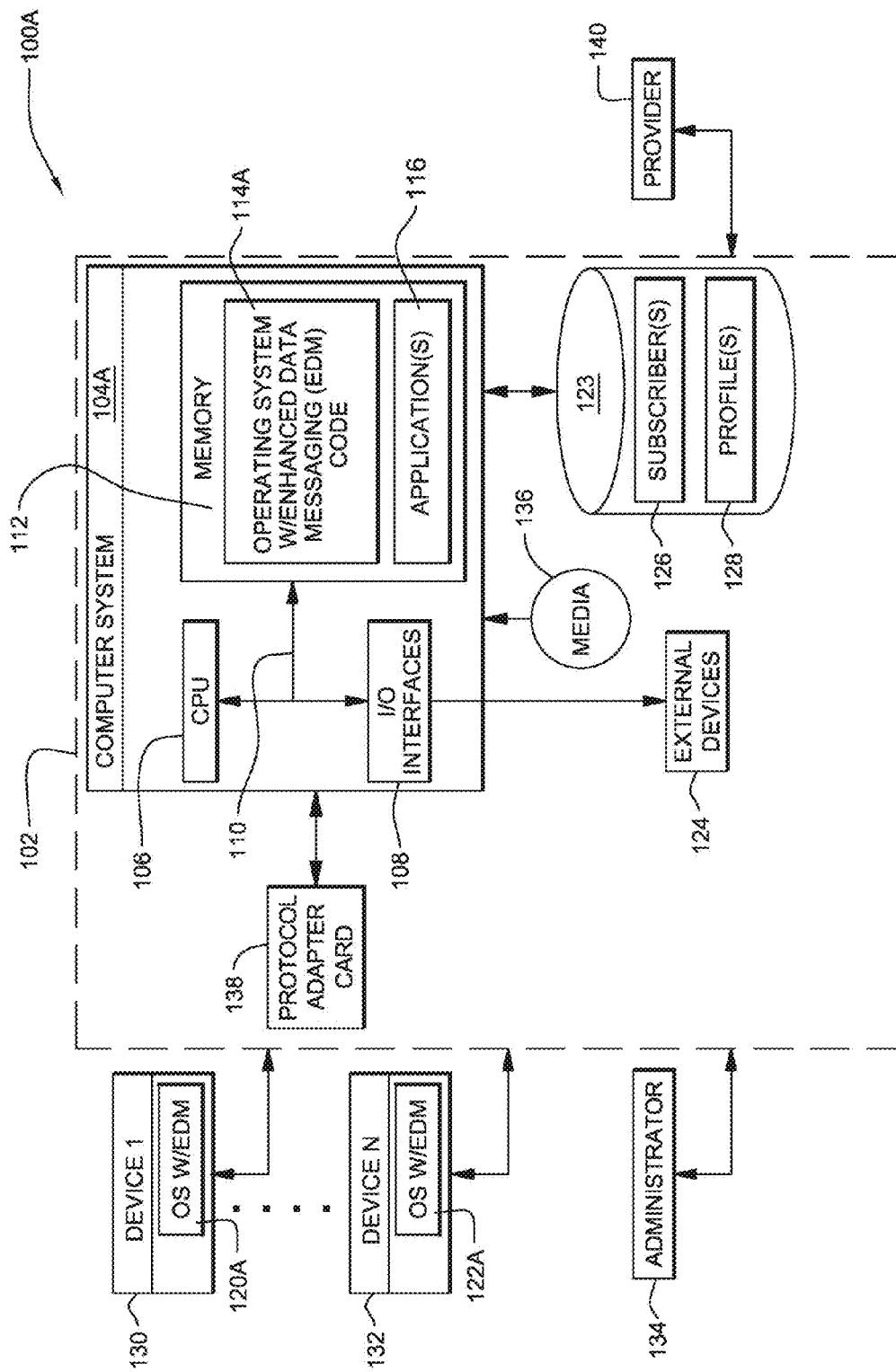
FIG. 1A is a schematic block system diagram illustrating an embodiment of a computer infrastructure having deployed thereon an enhanced data messaging (EDM) tool or code for providing selective or customizable enhanced privacy and control features to one or more portions of an electronic message, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1B:
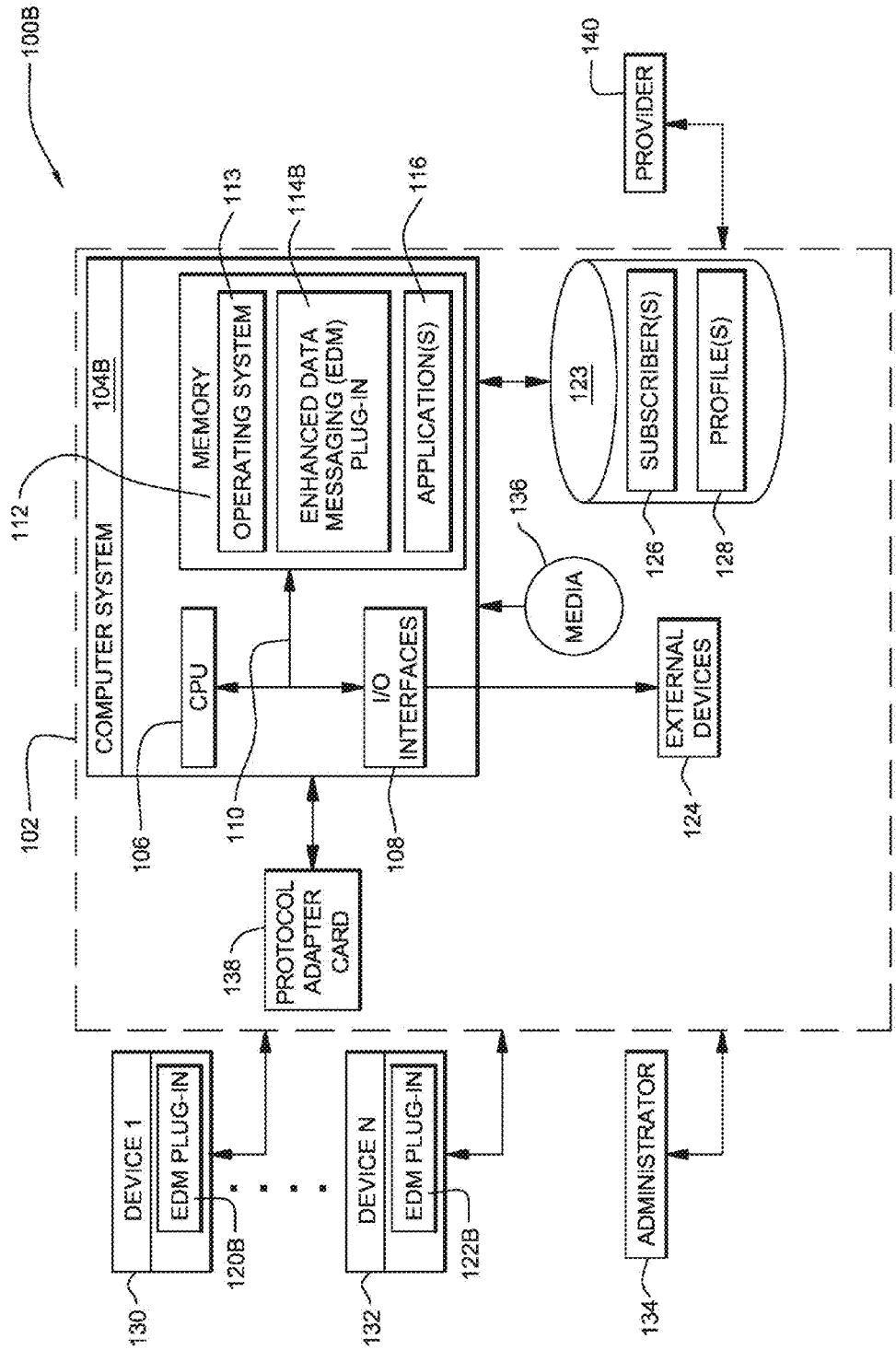
FIG. 1B is a schematic block system diagram illustrating another embodiment of a computer infrastructure having deployed thereon an enhanced data messaging (EDM) plug-in for providing selective or customizable enhanced privacy and control features to one or more portions of an electronic message, in accordance with an embodiment of the present invention.

In one embodiment, the invention provides a system for providing selective or customizable enhanced privacy and control features to one or more portions of an electronic message created on a device, using an enhanced data messaging (EDM) code loaded onto the device. Reference is now made to FIGS. 1A and 1B, reference numeral 100A and 100B, respectively, which illustrate embodiments of a computer infrastructure 102 for providing customizable or selective enhanced privacy and control features to one or more portions of an electronic message created on a device, using an enhanced data messaging (EDM) code loaded onto the device. In an embodiment, the EDM code can be loaded using wired and/or wireless technologies, as well as on a storage medium, such as, a compact disc. Turning to FIGS. 1A and 1B, FIGS. 1A and 1B illustrate respective computer systems 104A and 104B within a computer infrastructure 102, which includes an enhanced data messaging (EDM) code for providing selective enhanced privacy and control features to one or more portions of an electronic message created on a device. In an embodiment, as shown in FIG. 1A, computer system 104A has an operating system application 114A loaded into memory 112, with the operating system including an enhanced data messaging (EDM) code for providing a selective enhanced privacy and control features for one or more portions of an electronic message. As depicted in FIGS. 1A and 1B, computer infrastructure 102, which includes respective computer systems 104A and 104B, is intended to represent any type of computer architecture that is maintained in a secure environment (i.e., for which access control is enforced). It should be understood, however, that although not shown, other hardware and software components (e.g., additional computer systems, routers, firewalls, etc.) could be included in infrastructure 102. Further, as shown in FIGS. 1A and 1B, the respective computer systems 104A and 104B typically represent servers or computer systems running applications 116 or the like that include a central processing unit (CPU) 106 (hereinafter referred to as "processing unit 106"). In an embodiment, as shown in FIG. 1A, the enhanced data messaging (EDM) code is part of the operating system 114A that is loaded onto computer system 104A, whereas, in another embodiment, shown in FIG. 1B, the enhanced data messaging (EDM) code is loaded into memory 112 as a plug-in 114B, that is, as a separate component from the operating system application 113 loaded in memory 112. Further, as described herein below with respect to FIGS. 3, 5, 6 and 7, the enhanced data messaging (EDM) code may be built into an application program itself, such as, any of the Adobe® software programs owned by Adobe Systems Incorporated, or the enhanced data messaging (EDM) code may be built as part of a protocol used by a device, an applet, firmware, etc., as discussed further herein below with respect to FIG. 3. Turning to FIGS. 1A and 1B, FIGS. 1A and 1B illustrate embodiments where other applications 116 are loaded in memory 112 of the respective computer systems 104A and 104B. For instance, other applications 116 may be loaded into the respective memory component, such as, an e-mail application or a spreadsheet application or a picture sharing program or application. Further, each of the computer systems 104A and 104B is shown in communication with external I/O devices/resources 124 and a storage system 123. In general, processing unit 106 executes computer program code, such as, the operating system embodiment that includes the enhanced data messaging (EDM) code 114A (shown in FIG. 1A), or the operating system 113 (shown in FIG. 1B), the enhanced data messaging (EDM) code plug-in 114B (shown in FIG. 1B), and other applications 116 residing within memory 112. As mentioned herein above, the enhanced data messaging (EDM) code may be built into an application program itself, such as, any of the Adobe® software programs owned by Adobe Systems Incorporated, or the enhanced data messaging (EDM) code may be built as part of a protocol, an applet, firmware, etc., as discussed further herein below with respect to FIG. 3. While executing computer program code, such as, an application 116, the processing unit 106 can read and/or write data to/from memory 112, storage system 123, and/or I/O interfaces 108. For instance, in one embodiment, the computer system 104A and 104B may store a list of subscriber(s) 126 and/or user profile(s) 128 in storage system 123. In an embodiment shown in FIG. 1A, the list of subscriber(s) 126 include subscribers having respective devices 1 through N (reference numerals 130 through 132) that have loaded on them an operating system (OS) that includes a built-in enhanced data messaging (EDM) code (reference numerals 120A through 122A). In an embodiment shown in FIG. 1B, the list of subscriber(s) 126 include subscribers having respective devices 1 through N (reference numerals 130 through 132) that have loaded on them an enhanced data messaging (EDM) code plug-in (reference numerals 120B through 122B). Alternatively, data stored in storage 123 may be stored in a separate storage external to the infrastructure 102. Bus 110 provides a communication link between each of the components in respective computer system 104A and 104B, such that, information can be communicated within the infrastructure 102. External devices 124 can comprise any devices (e.g., keyboard, pointing device, display, etc.) that enable a user or sender to interact with respective computer system 104A and 104B and/or any devices (e.g., network card, modem, etc.) that enable computer system or server 104A and 104B to communicate with one or more other computing devices. The operating system with the EDM code (reference numeral 114A) or the EDM plug-in (reference numeral 114B) can be loaded into respective computer systems 104A and 104B from a type of computer readable storage media 136, such as, a magnetic tape or disk, optical media, DVD, memory stick, semiconductor memory, etc. or downloaded from the Internet using a protocol adapter card 138 corresponding to the protocol being used by the respective computer systems 104A and 104B. For instance, if the respective computer systems 104A and 104B utilize TCP/IP, then the protocol adapter card 138 is a TCP/IP adapter card. Similarly, the EDM code (reference numeral 120A through 122A) can be loaded onto a respective device (reference numeral 130 through 132) using wired and wireless technologies.

In general, a user or sender using device 1 (reference numeral 130) may subscribe to a messaging service provided by an Internet service provider 140 to establish connectivity to infrastructure 102 maintained by the Internet service provider for securing one or more portions of an electronic message using an enhanced data messaging (EDM) code or plug-in that is loaded onto a user or sender device, which implements the invention. As such, a user (user 1, reference numeral 130) accesses a respective computer system 104A or 104B over a network via interfaces (e.g., web browsers) loaded on a client or client device, for example, a personal computer, a laptop, a handheld device, etc. using wired and/or wireless technologies, as well as on a readable storage medium, such as, a compact disc. In the case of the latter, the network can be any type of network such as the Internet, a local area network (LAN), a wide area network (WAN), a virtual private network (VPN), etc. In any event, communication with infrastructure 102 could occur via a direct hard-wired connection (e.g., serial port), or via an addressable connection that may utilize any combination of wired line and/or wireless transmission methods. Moreover, conventional network connectivity, such as, Token Ring, Ethernet, Wi-Fi (Wireless Fidelity) or other conventional communications standards could be used. Still yet, connectivity could be provided by conventional TCP/IP sockets-based protocol or some other protocol. In this instance, the parties could utilize an Internet service provider to establish connectivity to infrastructure 102. It should be understood that under the present invention, infrastructure 102 could be owned and/or operated by a party, such as, a provider 140 or by an independent entity who offers an enhanced data messaging (EDM) code that provides pre-defined or customizable or selective enhanced privacy and control features that can be applied to one or more portions or data contained in an electronic message that is distributed. Regardless, use of infrastructure 102 and the teachings described herein could be offered to the parties on a subscription or fee-basis. Preferably, the invention provides a business method that performs the process steps of the invention on a subscription, advertising and/or fee basis. Further, the teachings described herein could be offered to one or more parties by offering incentives or as part of a marketing-based strategy or in exchange for advertising on devices having installed thereon the enhanced data messaging (EDM) code. For example, a service provider, such as, a solution integrator could offer a selective or customizable enhanced data messaging (EDM) code for securing portions of data contained in an e-mail message that is sent free of charge for a preset number of times and after the preset number of times, the user may be charged a small fee amount based on the amount of usage. In an embodiment, the EDM code can offer credits or monetary gift options for a user of the EDM code, for instance, as part of a billing option.

As such, a service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties. In either scenario, an administrator 134 could support and configure infrastructure 102, for instance, upgrading the enhanced data messaging (EDM) code 114A or plug-in 114B deployed on the computer system or server 104A and 104B.

Computer infrastructure 102 is only illustrative of various types of computer infrastructures for implementing the invention. For example, in an embodiment shown, computer infrastructure 102 comprises two or more computing devices (e.g., a server cluster) that communicate over a network to perform the various process steps of the invention. Moreover, respective computer systems 100A and 100B are only representative of various possible computer systems that can include numerous combinations of hardware. To this extent, in other embodiments, each of computer systems 100A and 100B can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 112 and/or storage system 123 can comprise any combination of various types of data storage and/or transmission media that reside at one or more physical locations. Further, I/O interfaces 108 can comprise any system for exchanging information with one or more external devices 124. Still further, it is understood that one or more additional components (e.g., system software, math co-processing unit, etc.) not shown in FIGS. 1A and 1B can be included in the computer infrastructure 102. Storage system 123 can be any type of system (e.g., a database) capable of providing storage for information under the present invention, such as, a list of subscriber(s) 126 and/or user profile(s) 128. To this extent, storage system 123 could include one or more storage devices, such as a magnetic disk drive or an optical disk drive. In another embodiment, storage system 123 includes data distributed across, for example, a local area network (LAN), wide area network (WAN) or a storage area network (SAN). Although not shown, additional components, such as cache memory, communication systems, system software, etc., may be incorporated into computer infrastructure 102.

Figure 2:
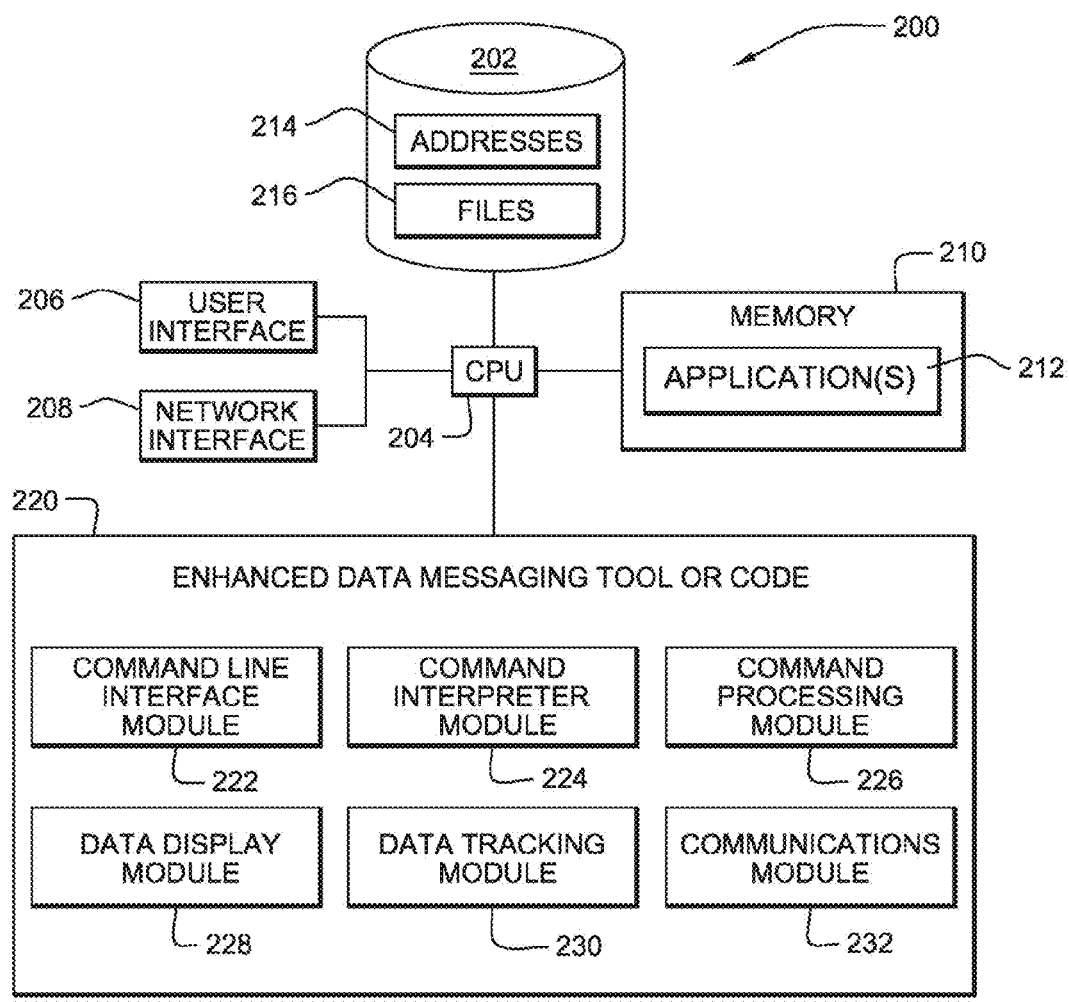
FIG. 2 is a schematic block system diagram illustrating an embodiment of an application server having deployed thereon an enhanced data messaging (EDM) code or tool for providing selective or customizable enhanced privacy and control features to one or more portions of an electronic message, in accordance with an embodiment of the present invention.

Turning to FIG. 2, reference numeral 200 depicts a schematic block system diagram illustrating one embodiment of a computer system or device 200, such as, a standalone computer or a laptop or a cell phone that has deployed thereon an enhanced data messaging (EDM) code or tool 220, which provides customizable or selective enhanced privacy and control features to one or more portions of an electronic message created on the system 200. It will be understood by one skilled in the art that the computer device 200 may include any of the following: a wired device, a wireless device, a personal computer, a server, a blade, a storage device, a pager, a PDA (Personal Digital Assistant), a touchscreen, a keyboard, a handheld device, a cell phone, a router, a facsimile machine, a scanner, a smart device, a GPS (Global Positioning System) receiver, and/or a RFID (Radio Frequency Identification) device and/or a protocol used by any of these devices. It will be understood by one skilled in the art that the invention may be used by any other device that can be configured to utilize the enhanced data messaging (EDM) code or tool, as described herein. Preferably, the computer system or device 200 includes a central processing unit (CPU) 204, a local storage device 202, a user interface 206, a network interface 208, and a memory 210. The CPU 204 is configured generally to execute operations within the system 200, such as, the enhanced data messaging (EDM) code or tool 220 or other application(s) 212 residing within memory 210. The user interface 206, in one embodiment, is configured to allow a user to interact with the enhanced data messaging (EDM) code or tool 220, including allowing input of data and commands from a user and communicating output data to the user. The network interface 208 is configured, in one embodiment, to facilitate network communications of the system 200 over a communications channel of a network. In an embodiment, the local memory 210 is configured to store one or more applications or programs 212, such as, an e-mail application or a word processing application. Further, in an embodiment, a storage system 202 stores one or more e-mail addresses 214 of recipients to whom e-mail messages are sent and/or one or more file(s) 216, such as, text documents or files, picture files, etc. that can be attached in an e-mail message. Alternatively, the e-mail addresses 214 and/or application file(s) 216 may be stored in memory 210 or in a separate storage.

In one embodiment, as shown in FIG. 2, the enhanced data messaging (EDM) code or tool 220 which runs on a computer system or device 200 comprises a logic unit that contains a plurality of modules configured to functionally execute the necessary steps of providing selective or customizable enhanced privacy and control features to one or more portions of an electronic message created by a user of the system. In particular, the enhanced data messaging (EDM) code or tool 220 includes a command line interface module 222, a command interpreter module 224, a command processing module 226, a data display module 228, a data tracking module 230 and a communications module 232. In an embodiment, the command line interface module 222 is configured to receive one or more commands inputted or entered by a user for providing selective enhanced privacy and control features to one or more portions of an electronic message created by the user of the system 200. In an embodiment, the user can pre-configure or pre-define one or more selective enhanced privacy and control features using one or more commands that are entered into and received by the command line interface module 222. The command interpreter module 224 is configured to interpret the commands inputted by the user of the system 200 and the command processing module 226 is configured to process the commands interpreted in order to provide selective enhanced privacy and control features to one or more portions of an electronic message created by the user. Further, the command processing module 226 is configured to execute the commands inputted into the command line interface module 222 by a user for providing selective enhanced privacy and control features to one or more portions of an electronic message created by the user of system 200. Data display module 228 is configured to display data to a user of the system 200. Furthermore, data tracking module 230 is configured to track the execution of commands for data where enhanced privacy and control features are selected by the user, for instance, where one or more portions of a message is to be deleted upon the expiration of a time period set forth by the user, as discussed herein below with respect to FIGS. 5 and 6. Moreover, the communications module 232 is configured to permit communication between the various modules of the enhanced data messaging (EDM) code or tool 220 and other components, such as, the storage 202, which stores the e-mail addresses 214 and/or file(s) 216 and/or applications or programs 212 running in memory 210. As mentioned herein above, the enhanced data messaging (EDM) code or tool 220 provides selective enhanced privacy and control features to one or more portions of an electronic message created by the user of the system 200. In an embodiment, the one or more portions of data contained in the electronic message created by a sender can include one or more of the following: a text message, an e-mail message, an instant message, an application file, a video file, a picture file, a image file, a sound file, an audio file, a compressed file, an uncompressed file, a voicemail application, an electronic page, an Internet frame, a web page, an avatar, a folder, a container, an icon, an emoticon, a link, a software component, a programming component and/or a flash file. Further, in an embodiment, the one or more pre-defined selective enhanced privacy and control features provided by the enhanced data messaging (EDM) code may include one or more of the following: one or more pre-defined passwords, a pre-defined time frame for the one or more portions of the electronic message to auto delete on a recipient device, wherein the pre-defined time frame may comprise number of seconds, number of days, number of weeks, number of months, number of years, a unique event, a recurring event, and/or an arbitrary time frame pre-defined by the sender, one or more local time zones, one or more international time zones, control features applicable to sender only, control features applicable to recipient only, control features applicable to both recipient and sender, copying control features, forwarding control features, blind carbon copy control features, storing control features, blocking control features (for blocking spam, unsolicited e-mails, etc.), group control features (for sending messages to multiple recipients, such as, members in a family), printing control features, language type control features, voice control features, auto-recovery rights for the electronic message, sender's rights to make changes to the electronic message, receiver's or recipient's rights to make changes to electronic message, repetition features for the electronic message, one or more attributes in the electronic message, additional rights in the electronic message, such as, in-network rights of sender, in-network rights of recipient/receiver, out-of-network rights of sender, out-of-network rights of recipient/receiver, track status of the one or more portions of data within electronic message, track status of electronic message, data count features, billing features, advertising features, features for turning on the enhanced data messaging (EDM) tool, features for turning off the enhanced data messaging (EDM) tool, auto-recovery rights for data in the electronic message, auto-recovery rights for the electronic message, recipient selection for the electronic message, animation features for the electronic message, syntax commands for initiating enhanced privacy and control features and security features for the electronic message, such as, Morse code, encryption-decryption keys, fingerprinting, retinal scanning, temperature-based security feature, frequency-based security feature and/or a customized code for the electronic message.

Figure 3:
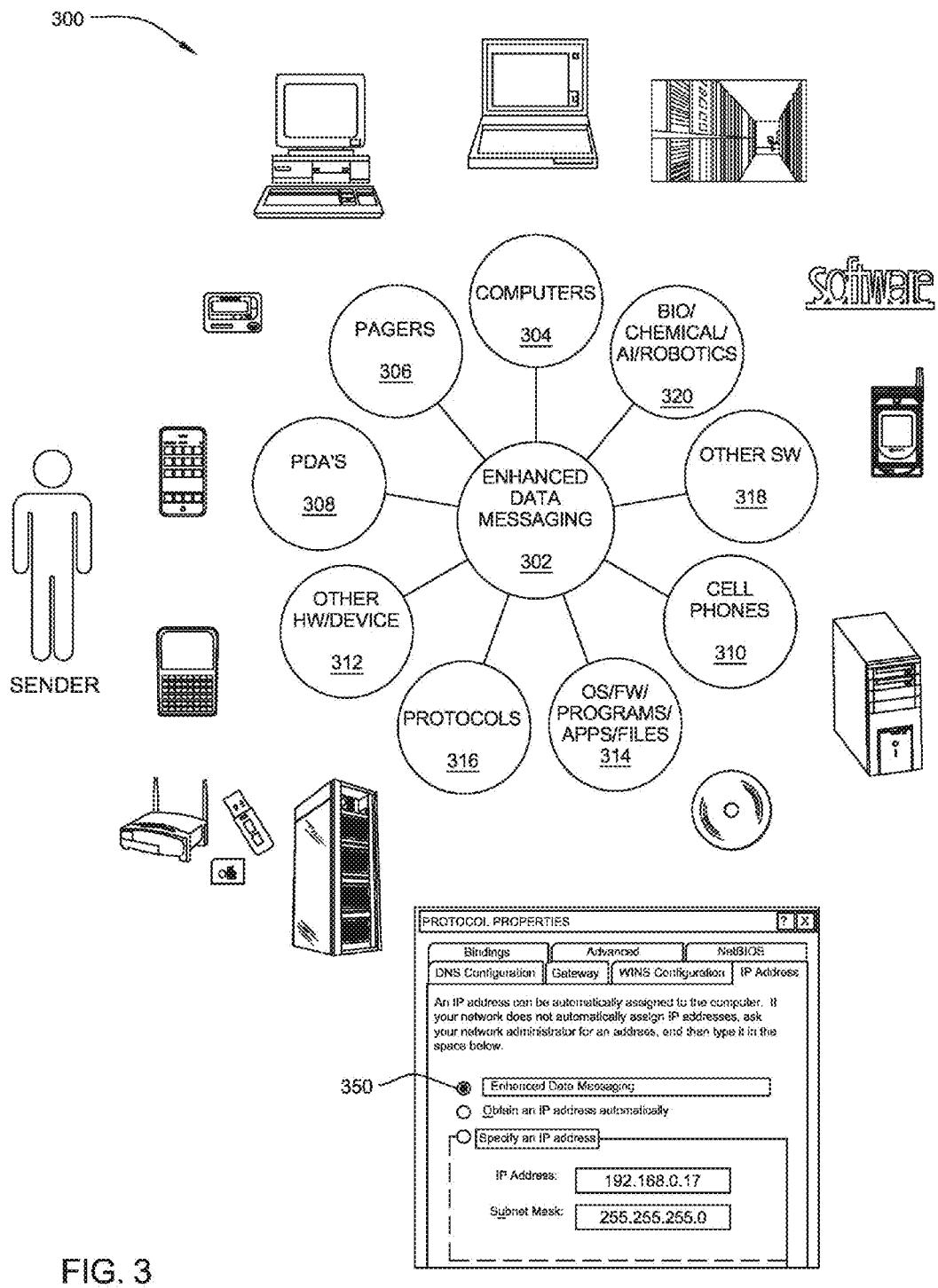
FIG. 3 is a schematic diagram illustrating an embodiment of an enhanced data messaging (EDM) code that may be deployed on a variety of hardware devices and software applications for providing selective or customizable enhanced privacy and control features to one or more portions of an electronic message, in accordance with an embodiment of the present invention.

Reference is now made to FIG. 3, reference numeral 300, which illustrates an embodiment of an enhanced data messaging (EDM) code or tool 302 that may be deployed on a variety of hardware devices, including as part of one or more software applications deployed on the various hardware devices for providing selective enhanced privacy and control features to one or more portions of an electronic message, in accordance with an embodiment of the present invention. As shown in FIG. 3, the enhanced data messaging (EDM) code or tool can be deployed on both wired and wireless devices, such as, computers 304, pagers 306, PDAs (Personal Digital Assistants) 308, cell phones 310 and other hardware devices or other types of devices 312, such as, smart devices, as explained herein below. For instance, the enhanced data messaging (EDM) code or tool can be deployed on land line phones, IP (Internet Protocol) phones, video gaming consoles, a GPS (Global Positioning System) receiver, Internet or smart appliances, such as, a smart television set or a web-enabled refrigerator, and/or a smart Internet radio or any other electronic communication device that utilizes the capability offered by the enhanced data messaging (EDM) code or tool installed thereon. For instance, a smart Internet radio can be configured to display an enhanced data messaging (EDM) text on a display panel of a smart radio or can play an EDM voice message to a listener on a speaker of a smart radio. Further, the enhanced data messaging (EDM) code or tool can be deployed on devices secured to living creatures and/or human beings. For instance, the enhanced data messaging (EDM) code or tool can be deployed on an electronic collar device used for a pet, such as, an electronic pet calling device that has EDM built into it for sending dog messages. In particular, the electronic collar device can be secured around the pet's neck for sending EDM messages. As such, an EDM message with owner's voice can be sent to the pet's device and can be played on the device, for instance, every 10 seconds, etc. until the pet is secured, etc. and the EDM message can be further configured to auto delete at a certain time, as explained further herein below with respect to FIGS. 5, 6 and 7. Further, the enhanced data messaging (EDM) code or tool can be configured for use in conjunction with a biological or chemical device 320. Similarly, the enhanced data messaging (EDM) code can be deployed on devices 320 using Artificial Intelligence technology or using Robotics technology. Additionally, the enhanced data messaging (EDM) code can be deployed as part of an operating system, for example, a newer version of an operating system, or can be deployed as firmware, programs, applications and/or files 314, and other software 318, such as, a plug-in or an applet or a file or folder, as described further herein below with respect to examples provided in FIGS. 5 and 6. Further, the enhanced data messaging (EDM) code can be deployed as part of any protocol 316, for instance, as part of any protocol properties, such as, the TCP/IP (Transmission Control Protocol/Internet Protocol) properties, where the enhanced data messaging (EDM) code 350 can be selected by a user of a particular protocol. Furthermore, the enhanced data messaging (EDM) code can be deployed on other software programs 318, such as, plug-ins or applets for a newer program, such that, the user or sender has control over the enhanced privacy and control features selected and applied to one or more portions of an electronic message created by the user or sender.

Figure 5:
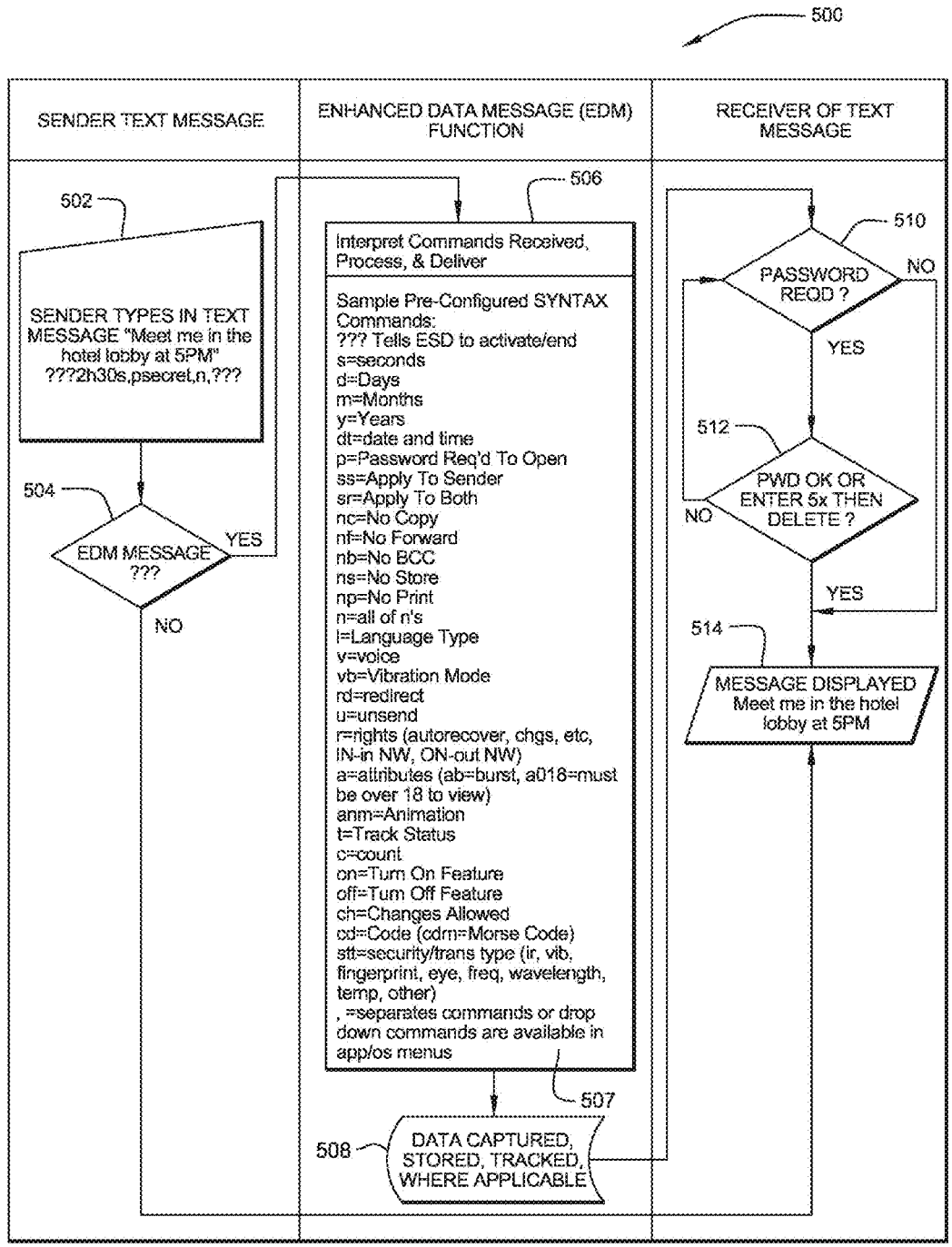
FIG. 5 is a flowchart outlining the steps performed by an enhanced data messaging (EDM) code loaded on a device for providing customizable or selective enhanced privacy and control features to one or more portions of an electronic message sent to a recipient device, in accordance with an embodiment of the present invention.

Additionally, other features can be included in the enhanced data messaging (EDM) code, as discussed further herein below with respect to FIGS. 5, 6 and 7, such as, a hide message feature or an unhide message feature, unsend and/or resend option features, markings (such as, read and/or unread options), reminder alerts, classified sites, journaling features, popup blocks, parental control features, security setting features, filter and viewing option features, payment plans and payment methods (such as, PayPal or by credit card, etc.) for use of the enhanced data messaging function or feature provided by the EDM code. For instance, the enhanced data messaging (EDM) code may provide features, such as, signature options, flags (such as, follow up, clear flag, etc.), reminder alerts, window views or zoom features, creation of wall papers, moving options (from one folder or file to another folder or file), draft option features for storing EDM messages that have been created, but have not been sent yet, set encoding features for translating one or more keystrokes into forms of human communication, for instance, using certain keystrokes to create a facial expression (smiley face or sad face) in a text message, sorting features (such as, sort by sender, unread, subject, date, size, attachment, flag, etc.), color features, managing add-ons, displaying and/or managing size of files received, etc. Further, in an embodiment, the enhanced data messaging (EDM) code provides the ability to delete a message containing one or more enhanced privacy features that is received by a recipient on a recipient device. Furthermore, in an embodiment, the enhanced data messaging (EDM) code provides the ability for a user to place a reminder in a calendar, a to-do list, buddy lists, address books, member directories, greetings, expressions, message boards and/or even the capability of porting to other applications, using import or export functions or using an Application Programming Interface (API) provided in an open source code. The enhanced data messaging (EDM) code may further provide features, such as, archiving messages, prioritizing messages, sorting messages (both online and offline), adding preferences, such as, default preferences, adding privacy alerts, adding plug ins, such as, an OEM (Original Equipment Manufacturer) plug-in, help screens, availability status indicators for instance, advising when a user (sender and/or receiver) is tied up in a meeting, is currently online or away on business or is not to be disturbed. Also, the sender and/or receiver can configure an EDM function or feature provided by the EDM code to handle EDM messages received, for instance, to accept and store all EDM messages received, to store offline an EDM message created for sending later to a receiver or recipient, etc. Further, the enhanced data messaging (EDM) code may provide features, such as, the ability to take back or unsend a message sent by a sender, if the message has not been opened by a recipient, customizing toolbars, determining features available for a specific version number of the enhanced data messaging (EDM) code or adding features provided by a specific version number of the enhanced data messaging (EDM) code. Furthermore, the enhanced data messaging (EDM) code or tool may be configured for any attachments, map files, folders, blogs, RSS (Rich Site Summary) feeds, streaming data feeds, weather feeds, searches and/or search engines, advertisements, podcasts, e-meetings and/or presentations, personal advertisements, e-auctions, chat, IM (Instant Messaging), etc. The enhanced data messaging (EDM) code can be integrated into existing code and/or application or comprise a standalone module.

Furthermore, it will be understood by one skilled in the art that additional functions or features can be configured for the EDM code including, but not limited to: the ability to queue multiple EDM messages to be sent at various dates and/or times, ability to place watermark(s) on viewed pages, ability to add or deny OCR (Optical Character Recognition) capabilities to contents of EDM messages, ability to add stationary, skin, or banner page to an EDM message, ability to display warning messages (for instance, when a message is going to be deleted or if payment is needed to use the EDM functionality), the ability to request one or more passwords for various parts contained in an EDM message or for the entire EDM message itself, the ability to save parts of an EDM message or the entire message in a specified location, the ability to upgrade a version of the EDM code, the ability to use touch screen functionality for devices with a display, the ability to use trackballs or wheels provided on a device (for instance, a Blackberry® phone), the ability to view options selected by a sender of an EDM message, the ability to set up appointments (include pencil in appointments) using contents of an EDM message, the ability to set alarms and/or configure ringtones, the ability to set up voice commands, the ability to use smart push to talk technologies (walkie-talkies, etc.), the ability to work with tasks and memo pad applications, the ability to work with Short Message Service (SMS) and Multimedia Messaging (MMS) capabilities, the ability to work with new and emerging technologies, such as, molecular technology, cellular technology, nano technology, biological technology, chemical technology, robotics, Artificial Intelligence, and other emerging technologies.

Figure 4:
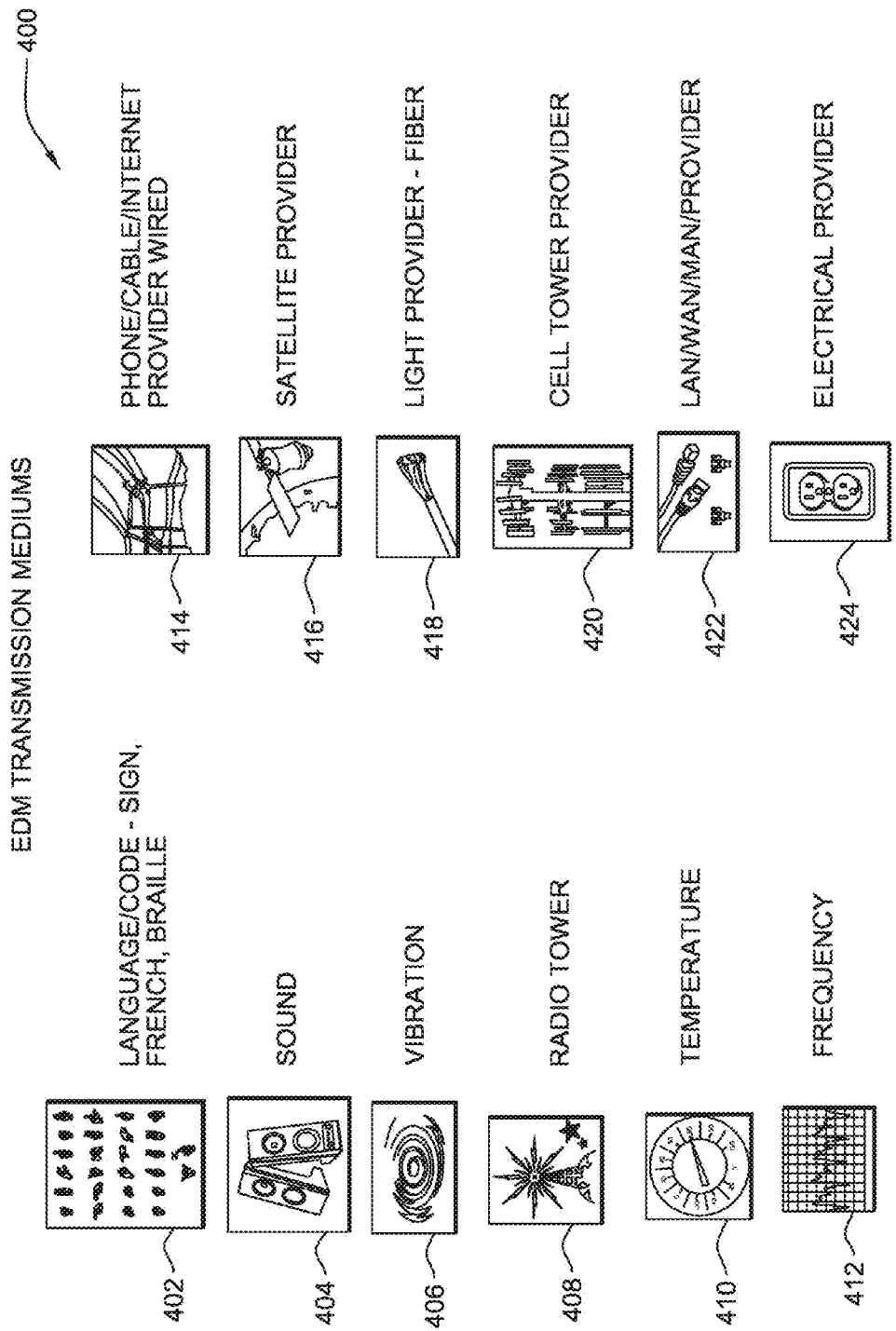
FIG. 4 depicts different types of transmission mediums that can be utilized for transmitting an enhanced data message created using an enhanced data messaging code, in accordance with an embodiment of the present invention.

Turning to FIG. 4, reference numeral 400 depicts different types of transmission mediums or types that can be utilized for transmitting an enhanced data message created using the enhanced data messaging (EDM) code or tool, in accordance with an embodiment of the present invention. In an embodiment, a transmission medium for transmitting a message created using the enhanced data messaging (EDM) code or tool can include one or more of the following: a phone line, a cable, the Internet, a wire line, a wireless line, a satellite, a sound medium, a fiber optic cable, a light medium, a cell tower, a vibration medium, a frequency medium, a wavelength medium, a temperature medium, a Bluetooth medium, an infrared medium, a radio tower, an electrical line, a local area network (LAN), a wide area network (WAN), a metropolitan area network (MAN), a wireless mesh network (WMN), a global network, a temperature medium, a frequency medium, a language medium, a special needs medium (such as, Braille code medium or other sensing code medium that utilizes other senses, such as, touch, smell, sound, sight, taste, etc.), a customizable code medium (designed for use by the police, military, fire fighters, ambulance personnel and/or first responders, government use, industry specific use, such as, medical personnel, hospital personnel, etc.), a broadcast medium, a unicast medium, a multicast medium, a point-to-point broadcast, a point-to-multipoint broadcast, a multiplexed broadcast, a time-division multiplexed medium, and/or a frequency-division multiplexed medium.

For instance, as shown in FIG. 4, a message created using an enhanced data messaging (EDM) code or tool may be transmitted using features provided in the enhanced data messaging (EDM) code or tool, such as, a particular language (English, French, etc.), reference numeral 402, a type of code, such as, Morse code, sign language and/or as Braille, etc. (for the visually impaired), so that persons with seeing impairments could also use the enhanced data messaging (EDM) code for sending messages. The electronic message may also be transmitted using sound features (reference numeral 404), for instance, for the hearing impaired, vibration features (reference numeral 406), temperature features (reference numeral 410), and frequency features (reference numeral 412). Further, an electronic message created using an enhanced data messaging (EDM) code may also be transmitted via a radio tower (reference numeral 408), over phone lines, cable lines, Internet provider wires (reference numeral 414), via satellite provided by a satellite provider (reference numeral 416), using light technology, such as, via optical fiber lines provided by a telecommunications provider (reference numeral 418), via a cell phone tower provided by a cell phone company provider (reference numeral 420), via network providers, such as, LAN (Local Area Network), WAN (Wide Area Network) and/or MAN (Metropolitan Area Network) providers (reference numeral 422), and via electrical lines provided by electrical providers or companies (reference numeral 424). In an embodiment, the EDM code provides the ability to setup menus for configuring and/or selecting various configurations, such as, a wireless medium, a Bluetooth medium, a wireless network, protocol options, etc. It will be understood by one skilled in the art that other transmission mediums may be utilized by the enhanced data messaging (EDM) code for transmitting an electronic message created by a sender.

In another embodiment, the invention provides a method for providing customizable or selective enhanced privacy and control features to one or more portions of an electronic message created using an enhanced data messaging (EDM) code installed on a device, in accordance with an embodiment of the invention. Turning to FIG. 5, reference numeral 500 outlines the method steps for providing selective enhanced privacy and control features to one or more portions of an electronic message created using an enhanced data messaging (EDM) code installed on a device. In step 502, as shown in FIG. 5, the user creates an electronic message by typing in a text message into a device, for instance, a cell phone, "Meet me in the hotel lobby at 5 pm", in accordance with an embodiment of the invention. Further, the sender uses the command syntax "???2h30s,psecret,n,???" in the text message created, which triggers the selective enhanced privacy and control features provided by the enhanced data messaging (EDM) code. In particular, the enhanced data messaging (EDM) code determines in step 504 whether or not the sender has selected one or more selective enhanced privacy and control features within the enhanced data messaging (EDM) code. The enhanced data messaging (EDM) code determines that the sender of the electronic message has selected enhanced privacy and control features given that the "???" syntax is used in the text message, as shown in step 502. It is understood by one skilled in the art that other kinds of syntax (/// or ###, etc.) can be used to indicate that the user wishes to use one or more enhanced data messaging (EDM) functions or features provided by the EDM code. For instance, the EDM syntax can be spelled out versus being abbreviated by a user in an EDM message that is created. As such, the command interpreter module of the enhanced data messaging (EDM) code interprets in step 506 the commands received from the sender, using the commands pre-configured or pre-defined by a sender (in 507) within the enhanced data messaging (EDM) tool or code. As shown in 506, the syntax "2h30s" is interpreted and processed by the command interpreter module of the enhanced data messaging (EDM) tool or code to mean that the message is to be deleted on the recipient's device in 2 hours and 30 seconds. Further, the syntax "psecret" is interpreted by the command interpreter module of the enhanced data messaging (EDM) tool or code to mean that a password, namely, "secret" is required in order to open the text message sent by the sender. Moreover the syntax "n" is interpreted by the command interpreter module of the enhanced data messaging (EDM) tool or code to mean that all of the n's apply to the message, that is, the recipient cannot copy (nc), forward (nf), blind copy (nb), store (ns) or print (np) the electronic message. Further, the sender can select from additional features, such as, auto deleting a message in seconds (s), in days (d), in months (m) or even years (y), and/or for a specific day and time (dt). Further, the sender can select a language feature (l), a voice feature (v), a vibration mode feature (vb), redirect feature (rd) for redirecting a recipient to a website, for instance, when payment is being requested and unsend feature (u) for taking back or "unsending" a message that has not yet been opened by a recipient. Also, the sender can choose other features, such as, rights (r) provided to a recipient, for instance, auto recover a deleted message or deleted portion, rights pertaining to "IN" for "in network" rights or "ON for "out of network" rights, attributes (a or A), such as, burst (ab), must be over 18 to view (a018). In addition, the sender can select a certain code "cd" to be used for delivering the message, such as, "cdm" for Morse code. Further, a comma "," syntax is used to separate commands selected. As shown in box 506 of FIG. 5, other commands can be selected by a user or sender to configure the electronic message created by the sender. For instance, use of "2d" instead of "2h" in the text shown in 502 would be interpreted by the command interpreter module to mean that the message is to be deleted in 2 days (instead of 2 hours). Further, for instance, a sender can select or type in EDM commands, such as, "???dt,5:00pmest091508???", which would translate into delete the EDM message on the recipient device on a specific date and time (dt), namely, Sep. 15, 2008 at 5:00 p.m. Eastern Standard Time (est). In an alternate embodiment, a user may configure the EDM commands to use military time, for instance, "1700" instead of "5:00pmest" or the commands could be configured separately for a specific date and a specific time. Additionally, a sender can select other syntax commands, such as, "on" to turn on certain features provided by the enhanced data messaging (EDM) tool or code or "off" to turn off certain features provided by the enhanced data messaging (EDM) tool or code. Further, as shown in FIG. 5, rights ("r") may be varied among the sender and the recipient. Similarly, attributes ("a") can be varied. For instance, a sender can create a message, such that, when the message is received on a recipient device, the message could burst on ("ab") or the message could be displayed in a certain font or displayed using certain animation. It will be apparent to one skilled in the art that other commands can be preconfigured within the enhanced data messaging (EDM) tool or code for providing selective enhanced privacy and control features to one or more portions of an electronic message. As mentioned herein above, a drop down menu within the enhanced data messaging (EDM) tool or code may be provided for a sender to select one or more commands for the electronic message, instead of the user having to type in the syntax, as shown in 502. Further, the EDM syntax can also be configured, such that, a user can spell out selected commands (versus having to abbreviate) used in an EDM message that is created. After the enhanced data messaging (EDM) tool or code has processed the commands in step 506, then in step 508, the command processing module of the enhanced data messaging (EDM) tool or code captures data inputted and stores, tracks data, where applicable. For instance, if the sender of the electronic message has selected the auto erase feature in the enhanced data messaging (EDM) tool or code, the command interpreter module of the enhanced data messaging (EDM) tool or code tracks the time on a recipient's device, such that, the electronic message is deleted in 2 hours and 30 seconds. The electronic message is sent to the recipient's or receiver's device, which is received by the enhanced data messaging (EDM) tool or code on the receiver's device. The enhanced data messaging (EDM) tool or code installed or deployed on the recipient device determines in step 510 whether or not a password is required and, if so, in step 512, the enhanced data messaging (EDM) tool or code prompts the recipient for a password, namely, "secret". In an embodiment, the enhanced data messaging (EDM) tool or code is configured to allow the recipient five tries to enter the correct password and if a correct password is not entered within the allotted number of tries, the electronic message is deleted on the recipient device. It is understood that the enhanced data messaging (EDM) tool or code can be configured with various forms of encryption based on a user's needs. Similarly, the message may not require any passwords to open the message. Accordingly, if a correct password is entered within the allotted time or the correct password is entered within the number of tries permitted in step 512 and/or if no password is required in step 510, the electronic message "Meet me in the hotel lobby at 5 pm" is displayed on the recipient's device in step 514. Similarly, in step 504, if the enhanced data messaging (EDM) tool or code determines that the electronic message does not wish to use the features provided in the enhanced data messaging (EDM) tool or code, then the electronic message "Meet me in the hotel lobby at 5 pm" is displayed on the recipient's device in step 514. The enhanced data messaging (EDM) features can be applied to web pages, zip files, flashes and/or voice mail in a voice mail system. Examples of additional syntax provided by the enhanced data messaging (EDM) tool or code are discussed herein below with respect to FIG. 7.

Figure 6:
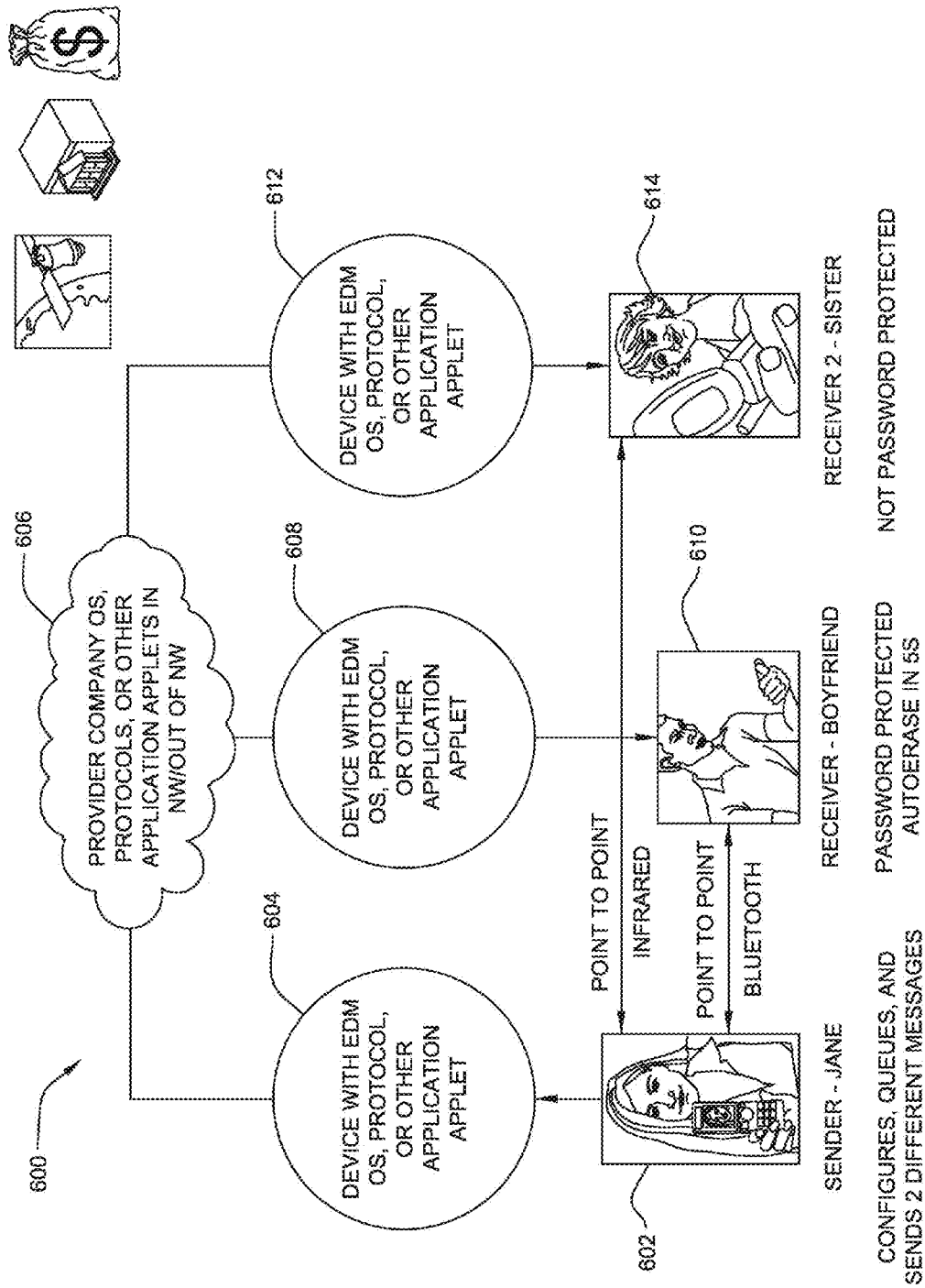
FIG. 6 illustrates an example of an electronic message created using an enhanced data messaging (EDM) code residing on a user or sender's device for providing customizable or selective enhanced privacy and control features to one or more portions of an electronic message sent to multiple receivers, in accordance with an embodiment of the present invention.

Reference is now made to FIG. 6, reference numeral 600, which illustrates an example of an electronic message created and distributed using selective enhanced privacy and control features provided within an enhanced data messaging (EDM) tool or code, in accordance with an embodiment of the invention. As shown in FIG. 6, a user or sender, Jane, using a device (reference numeral 602) creates two different electronic messages on her device, for instance, a cell phone 602, using the enhanced data messaging (EDM) tool or code (reference numeral 604) loaded on her cell phone device 602 for sending data, namely, a photograph or image and/or accompanying text message. In particular, one electronic message containing data is to be sent to her boyfriend's device (reference numeral 610), whereas, another electronic message containing the same data is to be sent to her sister's device (reference numeral 614). In an embodiment, sender Jane configures the first electronic message sent to her boyfriend's device 610, for instance, boyfriend's cell phone 610, by selecting a password protection feature provided within the enhanced data messaging (EDM) tool or code 604 on Jane's cell phone device 602. Further, sender Jane configures the first electronic message created on her personal device 602 by selecting certain enhanced privacy features within the enhanced data messaging (EDM) tool or code 604, which as discussed herein above can be either part of an operating system or can be independent of the operating system, such as, a plug-in or as a protocol. Further, Jane selects one or more privacy features by using appropriate syntax provided in the enhanced data messaging (EDM) tool or code command line interface or typing the appropriate syntax, such as, "???plady,5s,np,ns,nc,nf,nb, ???" and sends the electronic message to her boyfriend's device (reference numeral 610). In an embodiment, the electronic message created by Jane is sent to her boyfriend's device (reference numeral 610) via a cell phone service provider 606. In an embodiment, the cell phone service provider maintains a computer system that includes the enhanced data messaging (EDM) tool or code, either as part of its operating system, its protocols, applications, application applets or plug-ins, inside the service provider network or application applets outside of the service provider network. In an embodiment, the service provider's computer system transmits, using a transmission type or medium discussed with respect to FIG. 4, the electronic message from Jane's device to the boyfriend's device, which in an embodiment, also has loaded thereon the enhanced data messaging (EDM) tool or code 608, either as part of the cell phone operating system or as part of a protocol or an application applet or plug-in or as discussed with respect to FIG. 3. It will be understood by one skilled in the art that the EDM tool or code can be loaded using wired and/or wireless technologies, as well as on a storage medium, such as, a compact disc. Based on the enhanced data messaging (EDM) tool or code commands selected by Jane, the electronic message containing the photograph or image can only be viewed by her boyfriend on his device 610 for 5 seconds after the boyfriend enters the password "lady" and then the photograph or image and the accompanying text auto deletes on her boyfriend's device in 5 seconds. Furthermore, based on the features selected by Jane, Jane's boyfriend cannot print the image and/or text message received (np) and cannot store or save the received message (ns) and cannot copy (nc), cannot forward (nf), or blind carbon copy another recipient (nb). On the other hand, Jane sends to her sister's device, a cell phone (reference numeral 514) an electronic message without using any of the features provided in the enhanced data messaging (EDM) tool or code. Again, the service provider's computer system transmits, using a transmission type or medium discussed in FIG. 4, the electronic message from Jane's device to her sister's device, which in an embodiment, also has loaded thereon the enhanced data messaging (EDM) code 612, either as part of the cell phone operating system or as part of a protocol or an application applet or plug-in, as discussed herein above with respect to FIG. 3. As such, the message received from Jane will not be deleted and Jane's sister can print the image and/or text message received, can store or save the received message and its content on her device 614, can copy or forward or blind carbon copy another recipient. In an embodiment, the cell phone provider company may charge the sender Jane and/or each of the recipients or receivers, namely, the boyfriend and/or the sister a set fee or amount for messages sent and received, which utilize the enhanced data messaging (EDM) code deployed on their respective devices.

Figure 7:
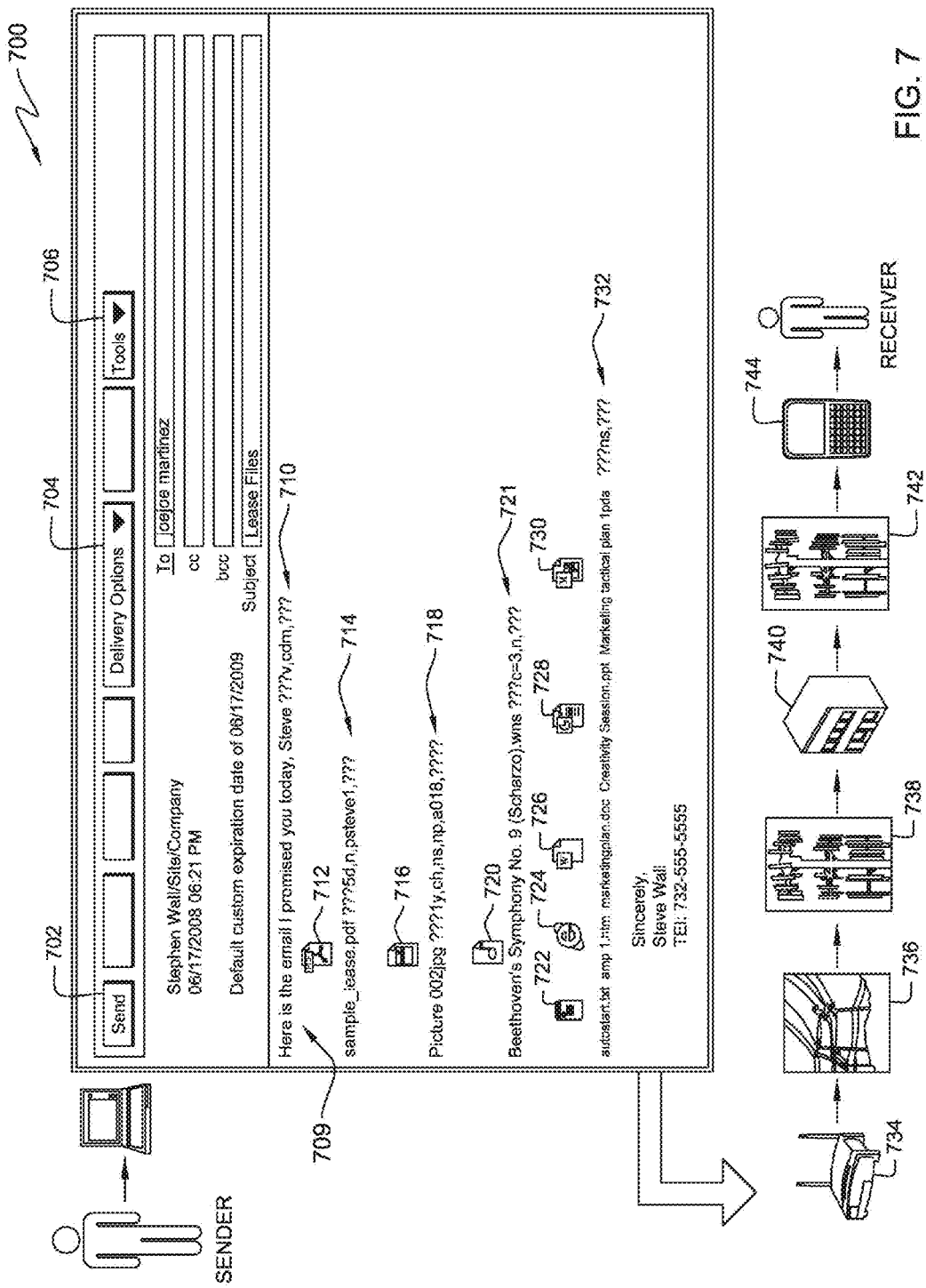
FIG. 7 illustrates an example of an electronic message created by a user or sender using the enhanced data messaging (EDM) code for providing selective or customizable enhanced privacy and control features to one or more portions of an electronic message sent to a recipient, in accordance with an embodiment of the present invention.

Referring to FIG. 7, reference numeral 700 illustrates an example of an electronic message created by a user or sender using the selective enhanced privacy and control features provided by an enhanced data messaging (EDM) code or tool configured to provide privacy and control features to one or more discrete portions of data (for instance, reference numerals 709, 712, 716, 720, 722, 724, 726, 728 and 730) contained in an electronic message that is sent to a recipient or receiver, in accordance with an embodiment of the present invention. As shown in FIG. 7, a user or sender creates an electronic message (or e-mail) 700 addressed to a specific recipient using an e-mail application on a user's device, namely, a laptop. In particular, the sender has included portions of data, such as, text and multiple attachments, where each portion of respective data is configured differently using the enhanced data messaging (EDM) code or tool. In an embodiment, a first data portion in the electronic message, for instance, a text message data portion, reference numeral 709, is configured to have a first set of configurable enhanced privacy and control features (reference numeral 710) than a second data portion in the electronic message, for instance, a file attachment data portion, reference numeral 712, which has a second set of configurable enhanced privacy and control features (reference numeral 714). Moreover, a third data portion in the electronic message, for instance, a picture file data portion, reference numeral 716, is configured to have a third set of configurable enhanced privacy and control features (reference numeral 718) than a fourth data portion in the electronic message, for instance, a music file attachment data portion, reference numeral 720, which has a fourth set of configurable enhanced privacy and control features (reference numeral 721). In particular, as shown in FIG. 7, the sender types in a message "Here is the e-mail I promised you today, Steve ???v,cdm,???" (reference numerals 709 and 710, where "Here is the e-mail I promised you today, Steve" (reference numeral 709) is the text portion of the message and where "???v,cdm,???" (reference numeral 710) represents the enhanced data messaging (EDM) features selected by the sender). As such, the recipient will hear a voice message (v) reminding the recipient that the recipient needs to enter an appropriate sequence of Morse code (cdm) in order to view the message. Further, the sender attaches a first file, namely an Adobe® file "sample_lease.pdf" (reference numeral 712), which is configured using the enhanced data messaging (EDM) code or tool. In particular, the sender has selected and entered the syntax command "???5d,n,psteve1,???" (reference numeral 714) for the Adobe® file 712, where the syntax "5d" means that the sender has selected the auto delete option or feature in the enhanced data messaging (EDM) code or tool of 5 days, thus, the Adobe® file will auto delete on the recipient's device in 5 days. Further, in an embodiment, the syntax "n" means that the recipient cannot copy, forward, blind carbon copy, store or print the attached Adobe® file sent by the sender. Moreover, the syntax "psteve1" means that the recipient will need to enter the password "steve1" in order to open up or read the Adobe® file. Also, as shown in FIG. 7, the recipient has attached another file, namely, a "jpeg" format picture file "Picture 002jpg" (reference numeral 716), where the sender has selected other privacy and control features provided by the enhanced data messaging (EDM) code or tool. In particular, the sender has entered the syntax command "???1y,ch,ns,np,a018,???" (reference numeral 718) for the picture file 716, where the syntax "1y" means that the sender has selected the auto delete option or feature in the enhanced data messaging (EDM) code or tool of 1 year, thus, the picture file will auto delete on the recipient's device in 1 year. Further, the syntax "ch" means that the recipient is allowed to make changes to the picture file attached and the syntax "ns,np" means that the recipient is not allowed to save the picture (ns) nor print the picture (np). Furthermore, the syntax "a018" means that an attribute (a) feature is selected where the picture can only be viewed by a recipient over 18 years old. In addition, as shown in FIG. 7, the sender has attached yet another file 720 named "Beethoven's Symphony No. 9 (Scharzo).wns" (reference numeral 720) and has selected and entered the syntax command "???c=3, n,???" (reference numeral 722). Here, the syntax "c=3" means that the music file can only be played on the recipient's device three times and where the syntax "n" means that the recipient is not allowed to save, print, copy, forward, or blind carbon copy the picture file to another recipient. Additionally, the sender has attached multiple other files (reference numerals 722, 724, 726, 728 and 730) within the e-mail and has selected and entered the syntax command ???ns,??? (reference numeral 732), which is applicable to each of the multiple attachments 722, 724, 726, 728 and 730. As such, the recipient is only stopped from saving these files on to recipient's device, given that only the ns (no storing or no saving) feature has been selected. It will be understood by one skilled in the art that other syntax commands may be used to select one or more features provided in the enhanced data messaging (EDM) code or tool. In addition, the sender may choose certain Delivery Options provided in the e-mail application by clicking on the Delivery Options button 704, such as, read receipt, delivery receipt, etc. Similarly, the sender may choose certain Tools 706 provided in the e-mail application, such as, spell check, grammar check, etc. Once the sender has finished composing the e-mail message, the sender clicks or enters the Send button 702. In an embodiment, the electronic message from the sender may be sent via a router 734, through wired lines 736, such as, a phone provider's wire or an Internet service provider's cable. Further, the electronic message may be routed via a cell phone tower 738 to a server 740, for instance, for billing a subscriber and then sent through another cell phone tower 742 and eventually delivered to the recipient's device 744. It is understood by one skilled in the art that other embodiments may be utilized by a sender having EDM capability. For instance, a sender may attach a song utilizing the EDM function on a device, where the receiver or recipient is given the ability to only listen to the song 3 times before the song file is deleted on the recipient's device. Further, the receiver or recipient could be redirected to a website for a billing service, such as, PayPal service (a Web payment processing service), where a billing method is requested of the recipient. In another example, the sender may attach a video to a web page attached to an EDM message, where the web page and video disappear after being viewed by the receiver based on EDM features selected by the sender.

Accordingly, the invention provides the ability for a sender to control an electronic message created using configurable or pre-defined commands provided in the enhanced data messaging (EDM) code or tool. In particular, a sender types in a message using special command syntax (for instance, syntax "???" or any other syntax characters) pre-configured or pre-defined by the user or sender for the device and can be even configured for a particular application, thus, informing the enhanced data messaging (EDM) code or tool in a device (cell phone or laptop) that the enhanced data messaging (EDM) code or tool is being activated. In particular, the features provided in the enhanced data messaging (EDM) code or tool, such as, the auto delete feature, apply not only to a text message being sent, but can be configured to apply to application files and/or protocols used by routers for communicating. For example, if a sender sends an Adobe® file, the sender can utilize the auto delete feature within the enhanced data messaging tool embedded in the Adobe® program to auto delete the file based on a finite number of time selected. As such, the invention enables the creation of electronic messages with multiple embedded privacy features for different portions with various configurations for the various commands provided. As mentioned herein above, the sender can use either a command line interface or a drop down menu for selecting commands. Further, a user can configure the commands within an operating system itself, if the enhanced data messaging (EDM) code or tool is part of the operating system or can configure an applet or an add-on program, such as, a plug-in. Furthermore, additional commands can be added, such as, "b" for billable and "l" for licensable, etc. A user may configure a message to produce certain beeps if it is a voice message, or may be able to change the auto delete time that was set or, for instance, may provide an auto recovery feature for recovering a deleted message or file. Further, the invention can be provided on a subscription basis, for example, where a service provider can charge a subscriber a certain amount extra (for instance, $2 a month) to provide the enhanced data messaging (EDM) features provided in the enhanced data messaging (EDM) code or tool. The enhanced data messaging (EDM) code or tool could also be licensed to companies for a fee.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for sending electronic messages, said method comprising:

embedding, by a processor of a computer system, a command syntax in an electronic message on a sender device, wherein the electronic message is to be sent by a sender from the sender device to a user at a recipient device, wherein the electronic message comprises a data structure consisting of the data or pointing to the data, wherein the embedded command syntax is coupled to the data structure in the electronic message, wherein the command syntax comprises a text string disposed between a first tag and a second tag, wherein the text string is coded to only describe and trigger one or more pre-defined selective enhanced privacy and control features for one or more portions of the data, wherein the command syntax includes one or more commands which upon being executed at the recipient device prevent the user at the recipient device who receives the electronic message from printing the received electronic message, storing the received electronic message, copying the received electronic message, forwarding the received electronic message, and blind carbon copying the received electronic message; and said processor transmitting, to the one or more intended user at the recipient device, the electronic message that comprises the command syntax coupled to the data structure.

2. The method of claim 1, wherein each portion of the one or more portions of the data is selected from the group consisting of a text message, an e-mail message, an instant message, an application file, a video file, a picture file, a image file, a sound file, an audio file, a compressed file, an uncompressed file, a voicemail application, an electronic page, an Internet frame, a web page, an avatar, a folder, a container, an icon, an emoticon, a link, a software component, a programming component, a flash file, and combinations thereof.

3. The method of claim 1, wherein the one or more pre-defined selective enhanced privacy and control features are selected from the group consisting of conditional viewing of the electronic message, one or more pre-defined passwords, a pre-defined time frame for the one or more portions of the data to auto delete on the recipient device, wherein the pre-defined time frame comprises at least one of: number of seconds, number of days, number of weeks, number of months, number of years, a specific date, a specific time, a unique event, a recurring event and an arbitrary time frame pre-defined by the sender, one or more local time zones, one or more international time zones, control features applicable to sender only, control features applicable to recipient only, control features applicable to both recipient and sender, unsend feature, redirect feature, copying control features, forwarding control features, blind carbon copy control features, storing control features, printing control features, language type control features, voice control features, auto-recovery rights for the electronic message, sender's rights to make changes to the electronic message, recipient's rights to make changes to electronic message, repetition features for the electronic message, one or more attributes in the electronic message, in-network rights of sender, in-network rights of recipient, out-of-network rights of sender, out-of-network rights of recipient, track status of the one or more portions of the data, track status of electronic message, data count features, billing features, advertising features, features for turning on the enhanced data messaging tool, features for turning off the enhanced data messaging tool, auto-recovery rights for the data in the electronic message, auto-recovery rights for the electronic message, recipient selection for the electronic message, animation features for the electronic message.

4. The method of claim 1, wherein the sender device comprises at least one of: a wired device, a wireless device, a personal computer, a server, a blade, a storage device, a pager, a PDA (Personal Digital Assistant), a touchscreen, a keyboard, a handheld device, a cell phone, a router, a GPS (Global Positioning System) receiver, a RFID (Radio Frequency Identification) device, and wherein the enhanced data messaging tool is installed as at least one of: an operating system, an operating system enhancement, firmware, an applet, a plug-in, a protocol, an application, a file and a folder.

5. The method of claim 1, wherein the transmission medium comprises at least one of: a phone line, a cable, the Internet, a wire line, a wireless line, a wired device, a wireless device, a satellite, a sound medium, a fiber optic cable, a light medium, a cell tower, a vibration medium, a frequency medium, a wavelength medium, a temperature medium, a Bluetooth medium, an infrared medium, a radio tower, an electrical line, a local area network (LAN), a wide area network (WAN), a metropolitan area network (MAN), a wireless mesh network (WMN), a global network, a temperature medium, a frequency medium, a language medium, a Braille code medium, a customizable code medium, a broadcast medium, a unicast medium, a multicast medium, a point-to-point broadcast, a point-to-multipoint broadcast, a multiplexed broadcast, a time-division multiplexed medium, a frequency-division multiplexed medium.

6. The method of claim 1, wherein the one or more pre-defined selective enhanced privacy and control features include a respective pre-defined time frame for the one or more portions of the data to auto delete on the respective recipient device, the one or more portions of the data being automatically deleted on the respective recipient device upon expiration of the respective pre-defined time frame.

7. The method of claim 1, wherein the one more pre-defined selective enhanced privacy and control features does not include a respective pre-defined time frame for the one more portions of the data in the electronic message to auto delete on the respective recipient device, the one more portions of the data will not automatically delete on the respective recipient device upon expiration of the respective pre-defined time frame.

8. A computer program product, comprising a computer readable hardware storage device having program code stored therein, said computer readable program code containing instructions configured to be executed by a processor of a computer system to implement a method for sending electronic messages, said method comprising:

said processor embedding a command syntax in an electronic message on a sender device, wherein the electronic message is to be sent by a sender from the sender device to a user at a recipient device, wherein the electronic message comprises a data structure consisting of the data or pointing to the data, wherein the embedded command syntax is coupled to the data structure in the electronic message, wherein the command syntax comprises a text string disposed between a first tag and a second tag, wherein the text string is coded to only describe and trigger one or more pre-defined selective enhanced privacy and control features for one or more portions of the data, wherein the command syntax includes one or more commands which upon being executed at the recipient device prevent the user at the recipient device who receives the electronic message from printing the received electronic message, storing the received electronic message, copying the received electronic message, forwarding the received electronic message, and blind carbon copying the received electronic message; and said processor transmitting, to the one or more intended user at the recipient device, the electronic message that comprises the command syntax coupled to the data structure.

9. The computer program product of claim 8, wherein each portion of the one or more portions of the data is selected from the group consisting of a text message, an e-mail message, an instant message, an application file, a video file, a picture file, a image file, a sound file, an audio file, a compressed file, an uncompressed file, a voicemail application, an electronic page, an Internet frame, a web page, an avatar, a folder, a container, an icon, an emoticon, a link, a software component, a programming component, a flash file, and combinations thereof.

10. The computer program product of claim 8, wherein the one or more pre-defined selective enhanced privacy and control features are selected from the group consisting of conditional viewing of the electronic message, one or more pre-defined passwords, a pre-defined time frame for the one or more portions of the data to auto delete on the recipient device, wherein the pre-defined time frame comprises at least one of: number of seconds, number of days, number of weeks, number of months, number of years, a specific date, a specific time, a unique event, a recurring event and an arbitrary time frame pre-defined by the sender, one or more local time zones, one or more international time zones, control features applicable to sender only, control features applicable to recipient only, control features applicable to both recipient and sender, unsend feature, redirect feature, copying control features, forwarding control features, blind carbon copy control features, storing control features, printing control features, language type control features, voice control features, auto-recovery rights for the electronic message, sender's rights to make changes to the electronic message, recipient's rights to make changes to electronic message, repetition features for the electronic message, one or more attributes in the electronic message, in-network rights of sender, in-network rights of recipient, out-of-network rights of sender, out-of-network rights of recipient, track status of the one or more portions of the data, track status of electronic message, data count features, billing features, advertising features, features for turning on the enhanced data messaging tool, features for turning off the enhanced data messaging tool, auto-recovery rights for the data in the electronic message, auto-recovery rights for the electronic message, recipient selection for the electronic message, animation features for the electronic message.

11. The computer program product of claim 8, wherein the sender device comprises at least one of: a wired device, a wireless device, a personal computer, a server, a blade, a storage device, a pager, a PDA (Personal Digital Assistant), a touchscreen, a keyboard, a handheld device, a cell phone, a router, a GPS (Global Positioning System) receiver, a RFID (Radio Frequency Identification) device, and wherein the enhanced data messaging tool is installed as at least one of: an operating system, an operating system enhancement, firmware, an applet, a plug-in, a protocol, an application, a file and a folder.

12. The computer program product of claim 8, wherein the transmission medium comprises at least one of: a phone line, a cable, the Internet, a wire line, a wireless line, a wired device, a wireless device, a satellite, a sound medium, a fiber optic cable, a light medium, a cell tower, a vibration medium, a frequency medium, a wavelength medium, a temperature medium, a Bluetooth medium, an infrared medium, a radio tower, an electrical line, a local area network (LAN), a wide area network (WAN), a metropolitan area network (MAN), a wireless mesh network (WMN), a global network, a temperature medium, a frequency medium, a language medium, a Braille code medium, a customizable code medium, a broadcast medium, a unicast medium, a multicast medium, a point-to-point broadcast, a point-to-multipoint broadcast, a multiplexed broadcast, a time-division multiplexed medium, a frequency-division multiplexed medium.

13. The computer program product of claim 8, wherein the one or more pre-defined selective enhanced privacy and control features include a respective pre-defined time frame for the one or more portions of the data to auto delete on the respective recipient device, the one or more portions of the data being automatically deleted on the respective recipient device upon expiration of the respective pre-defined time frame.

14. The computer program product of claim 8, wherein the one more pre-defined selective enhanced privacy and control features does not include a respective pre-defined time frame for the one more portions of the data in the electronic message to auto delete on the respective recipient device, the one more portions of the data will not automatically delete on the respective recipient device upon expiration of the respective pre-defined time frame.

15. A system comprising a processor, a memory coupled to the processor, and a computer readable storage device coupled to the processor, said storage device containing program code which, upon being executed by the processor, implements a method for sending electronic messages, said method comprising:

said processor embedding a command syntax in an electronic message on a sender device, wherein the electronic message is to be sent by a sender from the sender device to a user at a recipient device, wherein the electronic message comprises a data structure consisting of the data or pointing to the data, wherein the embedded command syntax is coupled to the data structure in the electronic message, wherein the command syntax comprises a text string disposed between a first tag and a second tag, wherein the text string is coded to only describe and trigger one or more pre-defined selective enhanced privacy and control features for one or more portions of the data, wherein the command syntax includes one or more commands which upon being executed at the recipient device prevent the user at the recipient device who receives the electronic message from printing the received electronic message, storing the received electronic message, copying the received electronic message, forwarding the received electronic message, and blind carbon copying the received electronic message electronic message, and blind carbon copying the received electronic message; and said processor transmitting, to the one or more intended user at the recipient device, the electronic message that comprises the command syntax coupled to the data structure.

16. The system of claim 15, wherein each portion of the one or more portions of the data is selected from the group consisting of a text message, an e-mail message, an instant message, an application file, a video file, a picture file, a image file, a sound file, an audio file, a compressed file, an uncompressed file, a voicemail application, an electronic page, an Internet frame, a web page, an avatar, a folder, a container, an icon, an emoticon, a link, a software component, a programming component, a flash file, and combinations thereof.

17. The system of claim 15, wherein the one or more pre-defined selective enhanced privacy and control features are selected from the group consisting of conditional viewing of the electronic message, one or more pre-defined passwords, a pre-defined time frame for the one or more portions of the data to auto delete on the recipient device, wherein the pre-defined time frame comprises at least one of: number of seconds, number of days, number of weeks, number of months, number of years, a specific date, a specific time, a unique event, a recurring event and an arbitrary time frame pre-defined by the sender, one or more local time zones, one or more international time zones, control features applicable to sender only, control features applicable to recipient only, control features applicable to both recipient and sender, unsend feature, redirect feature, copying control features, forwarding control features, blind carbon copy control features, storing control features, printing control features, language type control features, voice control features, auto-recovery rights for the electronic message, sender's rights to make changes to the electronic message, recipient's rights to make changes to electronic message, repetition features for the electronic message, one or more attributes in the electronic message, in-network rights of sender, in-network rights of recipient, out-of-network rights of sender, out-of-network rights of recipient, track status of the one or more portions of the data, track status of electronic message, data count features, billing features, advertising features, features for turning on the enhanced data messaging tool, features for turning off the enhanced data messaging tool, auto-recovery rights for the data in the electronic message, auto-recovery rights for the electronic message, recipient selection for the electronic message, animation features for the electronic message.

18. The system of claim 15, wherein the sender device comprises at least one of: a wired device, a wireless device, a personal computer, a server, a blade, a storage device, a pager, a PDA (Personal Digital Assistant), a touchscreen, a keyboard, a handheld device, a cell phone, a router, a GPS (Global Positioning System) receiver, a RFID (Radio Frequency Identification) device, and wherein the enhanced data messaging tool is installed as at least one of: an operating system, an operating system enhancement, firmware, an applet, a plug-in, a protocol, an application, a file and a folder.

19. The system of claim 15, wherein the transmission medium comprises at least one of: a phone line, a cable, the Internet, a wire line, a wireless line, a wired device, a wireless device, a satellite, a sound medium, a fiber optic cable, a light medium, a cell tower, a vibration medium, a frequency medium, a wavelength medium, a temperature medium, a Bluetooth medium, an infrared medium, a radio tower, an electrical line, a local area network (LAN), a wide area network (WAN), a metropolitan area network (MAN), a wireless mesh network (WMN), a global network, a temperature medium, a frequency medium, a language medium, a Braille code medium, a customizable code medium, a broadcast medium, a unicast medium, a multicast medium, a point-to-point broadcast, a point-to-multipoint broadcast, a multiplexed broadcast, a time-division multiplexed medium, a frequency-division multiplexed medium.

20. The system of claim 15, wherein the one or more pre-defined selective enhanced privacy and control features include a respective pre-defined time frame for the one or more portions of the data to auto delete on the respective recipient device, the one or more portions of the data being automatically deleted on the respective recipient device upon expiration of the respective pre-defined time frame.

* * * * *